April 7, 1942.　　J. H. BLANKENBUEHLER　　2,279,157
INDICATING DEVICE
Filed Feb. 16, 1940　　2 Sheets-Sheet 1

WITNESSES:　　　　　　　　　　　　　　　　INVENTOR
　　　　　　　　　　　　　　　　John H. Blankenbuehler
　　　　　　　　　　　　　　　　ATTORNEY April 7, 1942.   J. H. BLANKENBUEHLER   2,279,157
INDICATING DEVICE
Filed Feb. 16, 1940   2 Sheets-Sheet 2
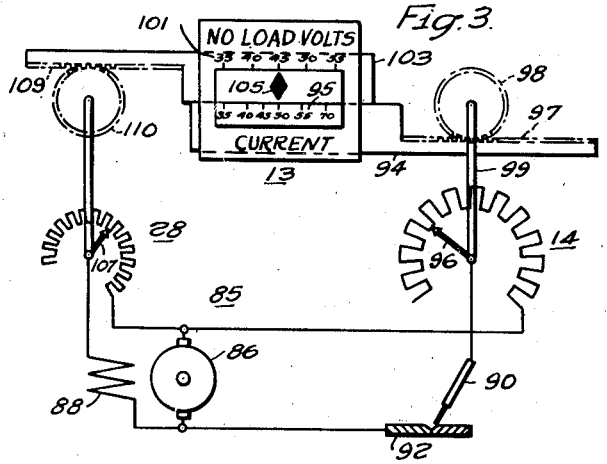
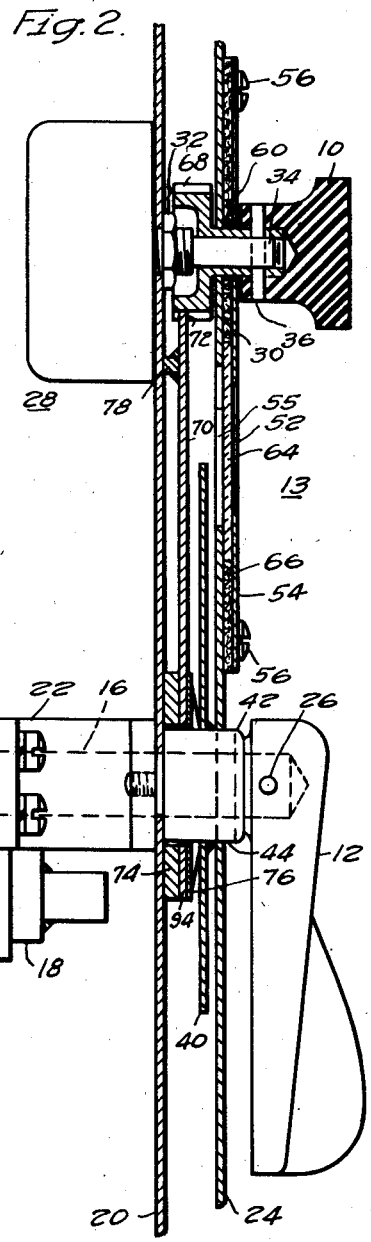
WITNESSES:
INVENTOR
John H. Blankenbuehler.
BY
ATTORNEY Patented Apr. 7, 1942

2,279,157

UNITED STATES PATENT OFFICE 2,279,157

INDICATING DEVICE

John H. Blankenbuehler, Edgewood, Pa., assignor to Westinghouse Electric & Manufacturing Company, East Pittsburgh, Pa., a corporation of Pennsylvania Application February 16, 1940, Serial No. 319,276

4 Claims. (Cl. 177—311)

My invention relates, generally, to indicating devices and it has reference in particular to an indicator for use with dual control generators which shall function to indicate the current and voltage for which the generator controls are set.

Generally stated, it is an object of my invention to provide a simple and effective indicator for a dual control generator for indicating the values of the preset current and voltage thereof.

More specifically, it is an object of my invention to provide a current and voltage indicator for a welding generator which is controlled by current and voltage control devices to readily indicate the current and voltage conditions for which the generator control devices are set.

Another object of the invention is to provide for operatively connecting indicating means to the dual controls of a source of power so as to enable the operator to readily ascertain with accuracy the conditions for which they are adjusted.

A further object of the invention is to utilize with the duel controls of a generator a movable current scale, a fixed voltage scale and a movable index which are so related as to correct for any mutual effect caused by operation of one of the controls and thus provide for indicating the current and voltage conditions for which the dual controls of the generator are preset.

Still another object of the invention is to provide for indicating the welding current and the open circuit voltage of a welding circuit by means of fixed indicia means, and movable indicia means and a movable index actuated by the controls of the source to which the welding circuit is connected.

Other objects will, in part, be obvious, and will, in part, appear hereinafter.

In accordance with my invention, a generator may be provided with a field rheostat for varying the terminal voltage thereof, and an adjustable current limiting impedance for varying the current in the load circuit connected thereto. In order to preset the rheostat and the impedance for predetermined voltage and current conditions in the load circuit connected to the generator, a dial having a scale calibrated in amperes may be provided which is actuated in accordance with adjustments of the current limiting impedance. A fixed scale calibrated in volts may be associated therewith in spaced relation, and a member having an index mark thereon, which is positioned between the scales, may be positioned so as to be actuated in accordance with adjustments of the field rheostat. By suitably proportioning the current and the voltage scales, and properly determining the operative relation between the field rheostat and the index bearing member in accordance with the characteristics of the generator, the index will cooperate with both of the scales to indicate in advance the open circuit voltage and the load current for any adjustment of the field rheostat and the current limiting impedance.

For a more complete understanding of the nature and scope of my invention, reference may be had to the following detailed description, which is to be taken in connection with the accompanying drawings, in which:

Fig. 2 is a side elevational view in section of the indicator of Fig. 1; and

Fig. 3 is a diagrammatic view of a welding system showing the application thereto of a modification of indicator of Fig. 1.

Figure 1:
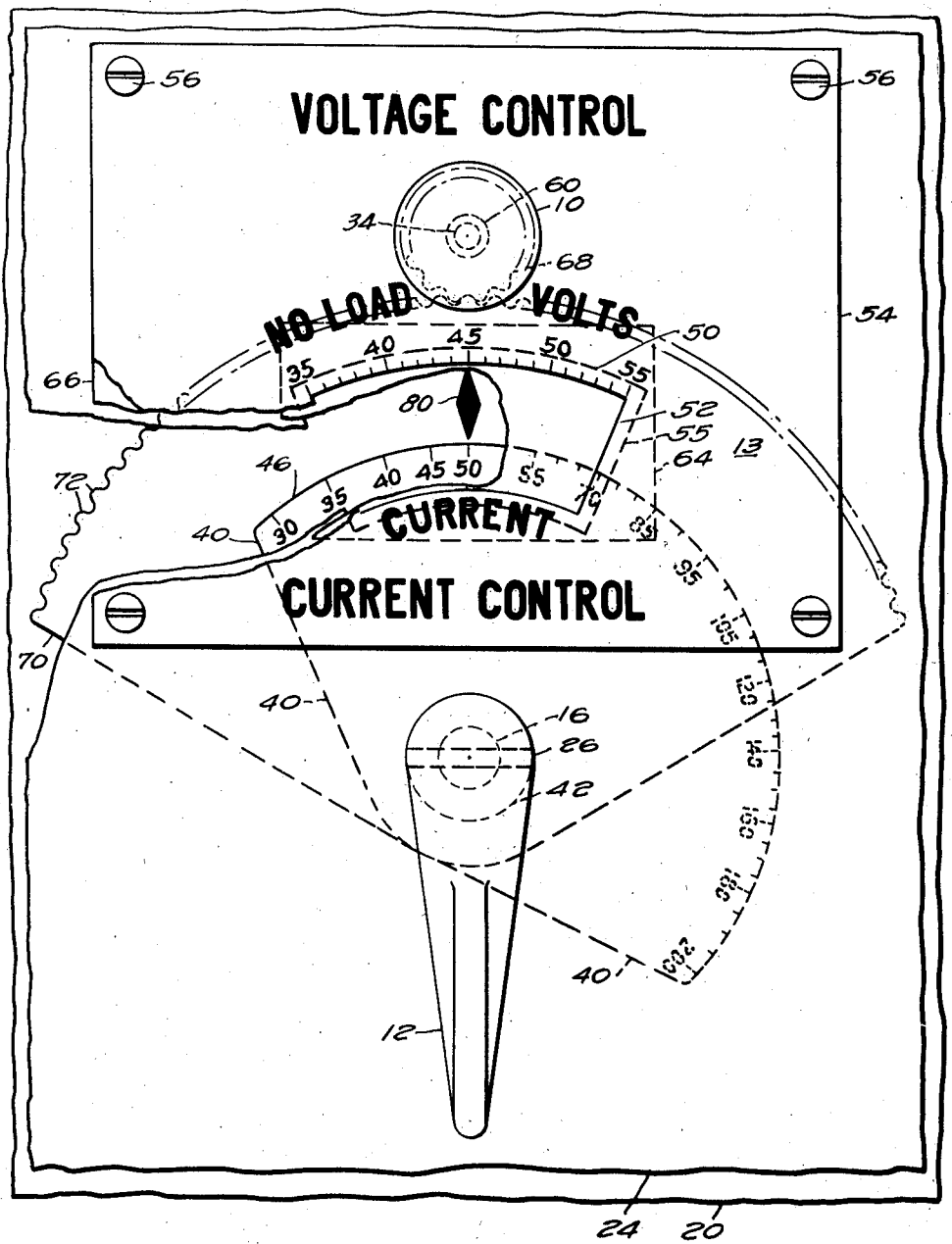
Figure 1 is a plan view, broken out in part, of an indicator embodying the principal features of the invention.

Referring particularly to Figs. 1 and 2 of the drawings, the reference numerals 10 and 12 denote the operating handles of the output control devices of a dual control welding generator (not shown), and the reference numeral 13 denotes generally indicating means which may be operated in response to movement of the handles of the output control devices for indicating the current and voltage conditions for which the control devices are preset.

In order to control the current output of the welding generator, a suitable current limiting control device, such as, for example, the adjustable resistor 14 connected in series circuit relation with the welding circuit may be provided. The adjustable resistor 14 may be of any suitable construction such as is well known in the art of resistors having, for example, a rotatable shaft 16 with a contact arm 18 secured thereto so as to be actuated to vary the amount of resistance inserted in the welding circuit. The resistor 14 may be mounted in any desirable manner, being, for example, supported on a control panel 20 by means of a bracket 22, so that the shaft 16 projects therethrough and also through an outer housing 24 of the generator control box. The handle 12 may be secured to the shaft 16 by means of a pin 26, so that the resistor 14 may be readily adjusted for different values of welding current.

In order to control the voltage of the generator, a suitable voltage control device, such as, for example, the field rheostat 28, may be provided. The field rheostat 28 may be of any construction well known in the art of field rheostats, and may be mounted on the control panel 20 by means of a threaded bushing 30 having a nut 32 positioned thereon, so that the operating shaft 34 of the rheostat projects through the control panel 20 and through the housing 24. The operating handle 10 of the field rheostat may be secured to the shaft 34 by means of a pin 36.

For the purpose of indicating the value of welding current for which the control devices are preset, suitable indicia means, such as the dial 40, may be provided having a bushing 42 adapted to fit on the shaft 16 of the resistor 14 to which it may be secured by means of a pin 44, so as to rotate therewith. A scale 46 calibrated in amperes may be provided about the periphery of the dial 40.

With a view to indicating the open circuit voltage of the generator for which the field rheostat 28 is set, suitable indicia means may be provided, such as for example, the fixed scale 50 calibrated in volts, which may be positioned along one edge of an opening or window 52 in a face plate 54 which is adapted to be secured to the housing 24 in alignment with a suitable opening or window 55 therein by means of the screws 56. A suitable opening 60 may be provided in the face plate 54 for the operating shaft 34 of the field rheostat. A cover glass 64 may be positioned between the face plate 54 and the housing 24, and provided with a suitable gasket 66 thereabout.

For the purpose of readily indicating both the voltage and current for which the resistor 14 and the field rheostat 28 are preset, and also correcting the current reading for the changes in the welding current caused by changes in the open circuit voltage of the generator, the indicating means 13 may be provided with movable index means for the voltage and current scales which may be actuated in response to operation of the field rheostat 28. For example, a pinion 68 may be positioned on the operating shaft 34 of the field rheostat and secured thereto by means of the pin 36, which also secures the handle 10 to the shaft. Means, such as the dial 70, may be provided, being, for example, rotatably mounted on the bushing 42 of the dial 40 between the current dial 40 and the control panel 20. Teeth 72 may be provided about the periphery of the dial 70 for engaging the pinion 68. Suitable means, such as the spacers 74 and 76, which may be positioned on the bushing 42 on either side of the dial 70, and a projecting support member 78, which may be secured to the back of the dial 70 adjacent the periphery, may be provided for maintaining the dial 70 in alignment and geared relation with the pinion 68, so as to be rotatable both relative to the movable current scale 40 and the fixed voltage scale 50. A suitable index mark 80 may be provided on the dial 70 intermediate the current and voltage scales, so as to cooperate therewith in indicating the values of current and voltage for which the current and voltage control devices are preset.

By properly proportioning both the current and voltage scales, and selecting the gear ratio between the pinion 68 and the index dial 70 in accordance with the current and voltage characteristics of the generator, the index 80 may be made to indicate accurately on the voltage and current scales the no-load voltage for which the field rheostat is set, and the welding current for all positions of both the field rheostat and the current limiting resistor. The indicator 13 may be applied to a welding system as shown in Fig. 3. In this instance, however, the indicator is of a different form although it is to be understood that it functions in accordance with the same principles as the particular form shown in Figs. 1 and 2 and that this view also serves to illustrate the application of the latter form.

Referring to Fig. 3, the reference numeral 85 denotes generally a welding generator having an armature 86 and a self-excited shunt field winding 88. The field rheostat 28 may be connected in series circuit relation with the field winding 88 of the generator for varying the terminal voltage thereof. The adjustable current limiting resistor 14 may be connected in series circuit relation with the armature 86, the welding electrode 90 and the work 92 for varying the welding current supplied by the generator 85.

For the purpose of indicating the welding current for which the field rheostat 28 and the current limiting resistor 14 are preset, this form of indicating means 13 may be provided with an elongated indicating member 94 having a scale 95 along one edge calibrated in amperes which corresponds to the current dial 40 of Figs. 1 and 2. The indicating member 94 may be actuated in accordance with movement of the contact arm 96 of the resistor 14 by means of a toothed rack member 97 engaging a pinion 98 mounted on the operating shaft 99 of the contact arm 96 so as to cause the indicating member 94 to slide lengthwise when the contact arm 96 is actuated to vary the setting of the resistor 14.

With a view to indicating the open circuit voltage for which the field rheostat 28 is set, a fixed scale 101, corresponding to the fixed scale 50 of Figs. 1 and 2, may be provided. This scale is calibrated in volts, and positioned in spaced relation to the movable current scale 95. An elongated movable indicating member 103 may be provided having an index mark 105 thereon which is positioned between the current and voltage scales. The member 103 corresponds to the dial 70 of the indicator of Figs. 1 and 2 and the index mark 105 to the index 80 thereof. The indicating member 103 may be operatively connected to the contact arm 107 of the field rheostat 28 by means of a toothed rack member 109 which engages a pinion 110 mounted on the operating shaft of the contact arm 107 so that the indicating member 103 will be caused to slide lengthwise in the proper direction and at the proper rate when the contact arm 107 is actuated to vary the setting of the field rheostat 28.

By properly proportioning the current and voltage scales, and the gear ratios between the pinions and toothed rack member attached to the movable indicating members 94 and 103, the index mark 105 may be made to cooperate with the current and voltage scales so as to indicate accurately the open circuit voltage of the generator and the welding current thereof for any positions of the contact members 96 and 107 of the resistor 14 and the field rheostat 28, respectively.

From the above description and the accompanying drawings, it will be apparent that by my invention I have provided in a simple and effective manner for accurately indicating to the operator the current and voltage conditions for which the dual controls of the generator have been preset. The indicating means comprises a minimum of moving parts, and may be readily adapted to different types of dual control generators having different current and voltage characteristics merely by providing the proper gear ratio between the pinion and the movable index member. Such an indicator is absolutely foolproof, since the values of the current and voltage for any given settings of the dual controls are clearly indicated by the single index, thus removing the possibility of error on the part of the operator, which sometimes occurs where it is necessary to read separate dials which are spaced some distance apart and make corrections which have an effect on the current output of changes in the no-load voltage.

Since certain changes may be made in the above description, and different embodiments of the invention may be made without departing from the spirit thereof, it is intended that all the matter contained in the above description or shown in the accompanying drawings shall be considered as illustrative and not in a limiting sense.

I claim as my invention:

1. In a welding circuit, in combination with a generator having no load voltage adjusting means and adjustable current limiting means, indicia means mechanically connected to the current limiting means for indicating the value of the welding current for a given adjustment of the said means, indicia means for indicating the voltage of the generator, and an index mechanically actuable by the field rheostat cooperative with both of said indicia means to predetermine the current and voltage of the welding circuit for given adjustments of the voltage adjusting means and current limiting means.

2. A power system comprising, a load circuit connected to a source of power, means for adjusting the voltage of the source, control means for predetermining the flow of current in the load circuit, voltage indicia means, current indicia means actuated by the control means, and index means actuated by the voltage adjusting means cooperative with said indicia means to predetermine current and voltage conditions of the load circuit.

3. The combination with a generator having voltage adjusting means and adjustable current limiting means, of indicating means for indicating and predetermining the current and voltage conditions of an associated load circuit for given adjustments of said means comprising, a rotatable current scale mechanically actuated by the current limiting means, a fixed voltage scale, and a movable member having an index for said scales connected in geared relation to the voltage adjusting means operable to predetermine the current and voltage conditions of the load circuit.

4. An indicator for a welding generator having a field rheostat with operating means therefor and an adjustable current limiting impedance with adjusting means therefor connected in the welding circuit comprising, a fixed voltage scale, a rotatable dial having a current scale thereon in spaced relation to the fixed voltage scale mechanically actuable by the adjusting means of the current limiting impedance, and a rotatable member having an index positioned between cooperative with both of said scales to indicate current and voltage conditions of the welding circuit for any adjustment of the current limiting impedance and the field rheostat associated in geared relation with the field rheostat operating means.

JOHN H. BLANKENBUEHLER.